United States Patent [19]

Pearce

[11] 3,717,374
[45] Feb. 20, 1973

[54] HOOD COUPLING FOR BABY CARRIER

[76] Inventor: Hugh J. Pearce, P.O. Box 224, Bell, Calif. 90201

[22] Filed: March 18, 1971

[21] Appl. No.: 125,534

Related U.S. Application Data

[63] Continuation-in-part of Ser. No. 113,128, Feb. 8, 1971, abandoned.

[52] U.S. Cl. ................................................. 296/111
[51] Int. Cl. ................................................. B60j 7/10
[58] Field of Search .......... 296/107, 111, 124, 125, 127–129, 296/131, 132, 1 B, 28 B, 78 A; 280/47.38, 47.4; 297/184, 354, 355, 366, 376, 377; 5/362–364, 93, 97; 248/226 R, 228 C

[56] References Cited

UNITED STATES PATENTS

| 2,433,504 | 12/1934 | Zimmermann | 296/1 B UX |
| 2,681,659 | 6/1954 | Hrinsin | 5/93 R UX |
| 286,186 | 10/1883 | Downing | 280/47.4 X |
| 202,355 | 4/1878 | Lindsey | 296/110 |
| 712,651 | 11/1902 | Collier | 297/184 X |
| 1,289,965 | 12/1918 | Tichenor | 296/78 A X |
| 1,758,112 | 5/1930 | Hewitt | 296/110 |
| 2,030,407 | 2/1936 | Serisky | 296/110 X |
| 2,475,775 | 7/1949 | Boren | 5/93 R |
| 2,565,867 | 8/1951 | Lundquist | 297/376 X |

FOREIGN PATENTS OR APPLICATIONS

| 625,871 | 5/1927 | France | 296/107 |
| 209,586 | 1/1924 | Great Britain | 297/184 |
| 243,496 | 12/1946 | Switzerland | 280/47.4 |

Primary Examiner—Benjamin Hersh
Assistant Examiner—Robert R. Song
Attorney—Howard L. Johnson

[57] ABSTRACT

Hood or sun shade composed of nestable segments, at each side brought together as a cluster and traversed by a shaft which dependently carries an offcenter swinging latch arm and an opposing hook arm for joint attachment to the convex side channel of a baby carrier. Axial tensioning means on the shaft enables positioning the hood at selected outspread position and simultaneously locks the assembly to the channel, at desired location along length. Each hood segment is a relatively rigid, inverted-U-shape cross strut with successive ones having mutual stop means to prevent their further separation when fully outspread. Rearmost segment is attached to flat, positioning panel which overlies inner face of floor of carrier and is slidable therealong as hood is moved lengthwise to carrier. Panel can also be uptilted and set at selected angle to elevate infant's head.

10 Claims, 6 Drawing Figures

PATENTED FEB 20 1973
3,717,374
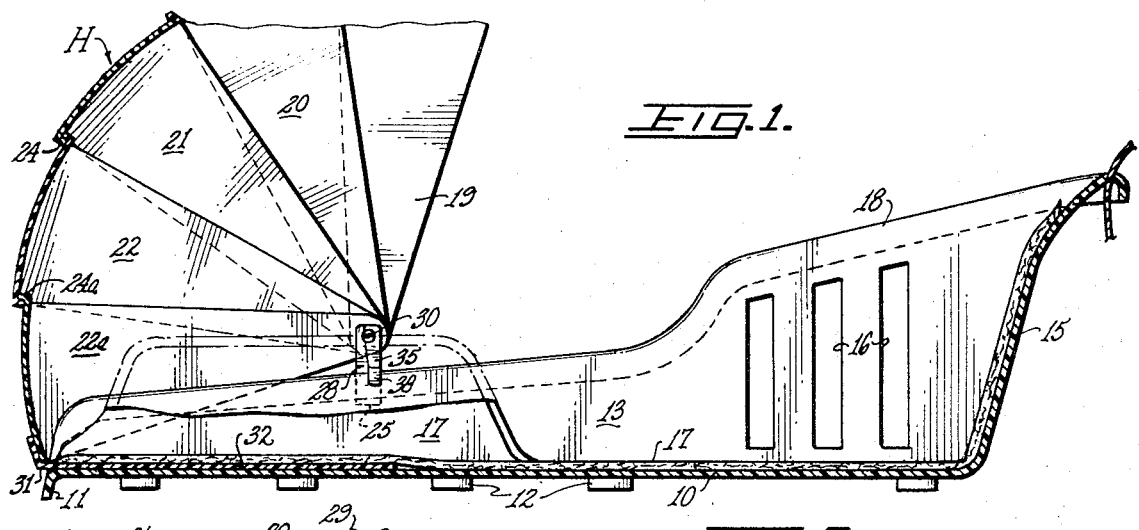
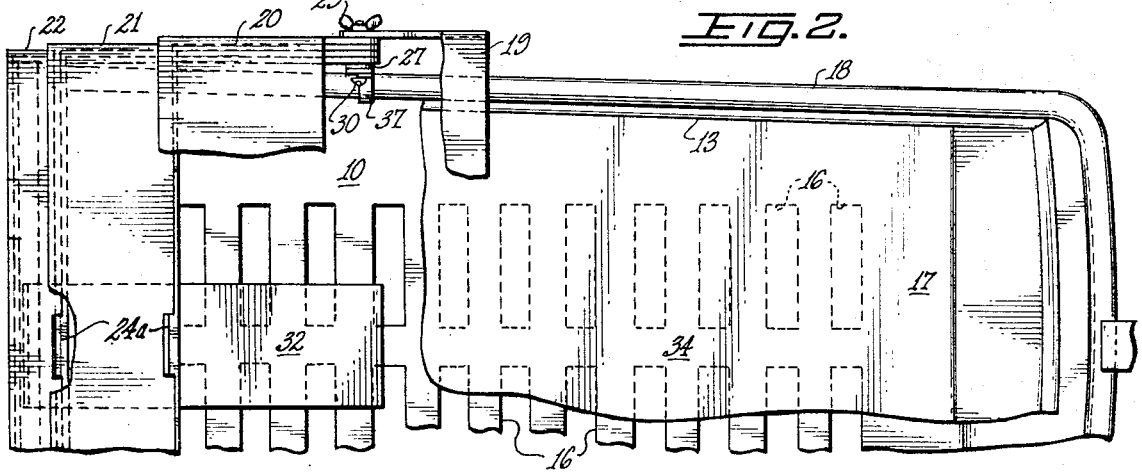
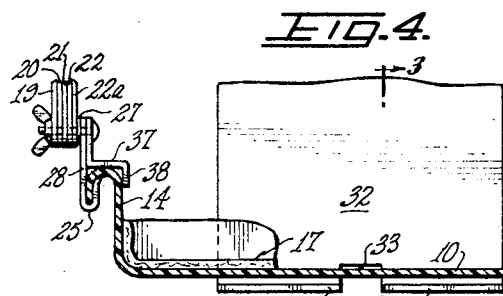
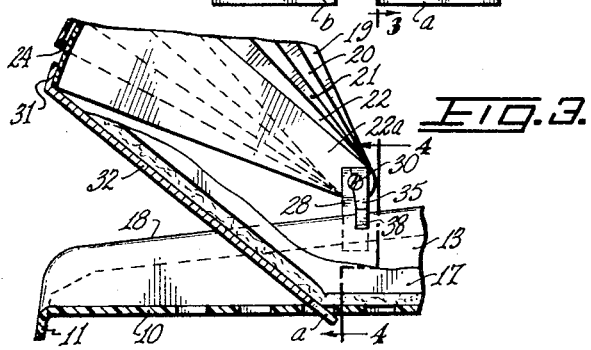
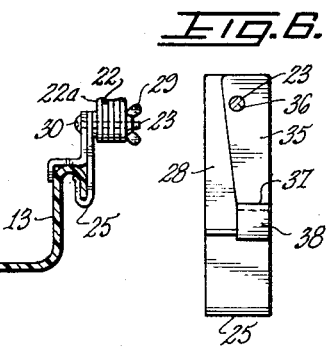
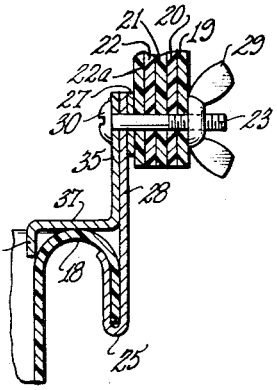
INVENTOR.
HUGH J. PEARCE
BY
*Howard L. Johnson*
ATTORNEY

HOOD COUPLING FOR BABY CARRIER

This is a continuation-in-part of my pending application Detachable Hood For Baby Carrier, filed Feb. 8, 1971, Ser. No. 113,128, now abandoned.

As noted in the foregoing abstract, the invention provides a hood or sun vizor which is adjustably mountable along the opposite convex upwardly-bowed side channels of a baby carrier or the like. Such hood can be provided by itself so as to be added to carriers which lack such covering, and likewise maybe transferred from one carrier to another. The attachment means provides (at each side) a pair of arms, one with a hook-end to reach under the convex edge and grasp the channel, the other arm having a contact foot to abut the top of the channel when swung thereagainst. Both arms are swingable from a transverse shaft which traverses the clustered ends of the hood segments or cross struts, and by axial tensioning means the attachment arms are locked to the channel at the same time that the hood segments or struts are secured at selected outspread or collapsed positions. The outermost hood segment is secured to a forked-ended tiltable positioning panel which is slidable along the floor of the carrier upon lengthwise movement of the hood; it prevents the hood from falling backward.

In the drawings which illustrate a presently preferred embodiment of the invention FIG. 1 is a longitudinal vertical sectional view taken through a baby carrier with my hood mounted thereon.

FIG. 2 is a plan view of a portion of the same with parts broken away.

FIG. 3 is a detail view of part of the left portion of FIG. 1 taken along the line 3—3 of FIG. 4, with the positioning panel raised.

FIG. 4 is a staggered transverse sectional view taken along the line 4—4 of FIG. 3.

FIG. 5 is a transverse sectional view taken through the adjustable attachment means for connecting the hood to a side channel and simultaneously tensioning the hood segments at a desired spread.

FIG. 6 is an elevational view of a pair of attachment arms.

The baby carrier here illustrated is the familiar construction which is commercially distributed, formed as a molding of light-weight synthetic plastic material. In use, it is usually carried or "cradled" in a person's arms, or sometimes strapped to his back. When not carried by an adult, it can be laid flat as here shown, or can be placed upright and tilted back against a support. Straps are usually provided on the carrier for holding the infant in place while being moved.

The carrier has a generally rectangular, flat bottom or back 10 from which short dependent tabs are turned down at spaced intervals or molded as projecting posts so as to form feet 12; and the top edge is also turned backward to form a transverse support rib 11. Along each side, the back wall is turned up to form more or less perpendicular side walls 13, 14, and such lateral enclosure is completed by a slanted end-wall 15 which may serve as a seat for an infant. Open portions or pairs of slots 16 are formed in the sides and bottom, both to reduce the weight of material and to allow ventilation during use. The longitudinal edges of the side walls and the outer edge of the bottom wall are outwardly turned down to form a continuous, generally inverted U-shaped or convex channel 18 which thus continues along the three sides. A loosely form-fitting (rectangular) padding 17 may be placed against the inner face like a mattress.

The hood or sun vizor H is formed of a plurality of nested, generally inverted-U-shaped cross struts 19, 20, 22, 22a which in mounting have their free ends brought together like a cluster and jointly traversed by a headed shaft 23 having its outer end threaded to carry a wing nut 29. A washer 27 is interposed on the shaft 23 between the struts and the attachment arm 28 near the head 30. In the earlier application, the cross struts were relatively narrow and jointly supported sheet material which formed the hood and infolded between them upon the struts being brought together. Such form can also be used with the present attachment means but an additional or alternate form is here shown wherein the cross struts are each wide enough to form a full hood segment (without added material or covering) and are locked together in their fully outspread position by oppositely turned, mutually engaging lugs or stop means 24, 24a.

Also traversed by the shaft 23 are a juxtaposed pair of attachment arms 28, 35, the former turned to a hook-end 25 which underlies the channel wall 18. The other or latch arm 35 which pivots or swings from the shaft 23 is approximately Z-shaped with a contact foot portion 37 which abuts the top of channel 18, and a terminal down-turned edge 38 which need not necessarily touch the channel wall (depending on the width of the channel varying from one carrier to another). It will be observed that the portion 37 is a flat chordal surface which pivots from a point 36 (i.e. the shaft 23) which is offcenter to a radius through the chord or generally offcenter to the longitudinal axis of the arm 35. Thus the whole length of the foot 37 comes down on the channel top at the same time, rather than binding with a single point contact. When the attachment arms 28, 35 thus engage opposite faces of the channel, they are locked in such position by tightening the wing nut 29; at the same time such action sets the hood segments 19, 20, 21, 22, 22a at whatever outspread or collapsed position they have been located. By merely loosening the wing nuts, the hood assembly can be slid lengthwise along the channel 18, or the position of the hood segments changed at will, etc. Or the assembly can be readily removed and transferred to another carrier if desired.

The rearmost of the hood support arms 22a is centrally attached to the transverse end-rib 31 of a flat, positioning panel 32 which may thus slidingly extend along and overlie the inner face of the carrier bottom or back 10, beneath or underlying the padding 17. The panel thus moves lengthwise to the carrier as the coupling attachments and hood are moved in one direction or the other, along the channels 18. The lower or free end of the panel is rectangularly notched at 33 so as to have its forked end straddle and engage the elongated central rib or spine 34 of the carrier, with its forked ends *a* and *b* inserted in a selected pair of the succession of cross slots 16. By such engagement, the panel 32 can be raised or uptilted so as to support the infant's head; this may be desired particularly when the carrier is upstanding and leaned back at an angle against a wall. Such elevation of the panel is then easily changed when shifting the carrier itself between upright and more-or-less horizontal positions. At the same time, the amount of extension or outfold of the hood itself can be adjusted or changed from time to time as the rays of the sun or other factors may dictate. If it is not desired to use the panel as a head support, the notch 33 can of course be omitted.

I claim:

1. A collapsible hood assembly for detachable attachment to a baby carrier or the like of the type characterized by a convex upwardly-bowed channel disposed along each side of the carrier, said channel including a depending flange, the assembly comprising in combination;

a hood formed with a plurality of nestable cross struts having their respective ends brought together at each side of the hood as a cluster;

a pair of transverse shafts each traversing a respective cluster of ends of said cross struts;

channel attachment means comprising a hook-like arm and a latch arm, both traversed by one of said shafts adjacent its cluster of traversed cross strut ends, the hook-like arm being adapted to engage said flange from beneath, and the latch arm being swingable on the shaft offcenter to the longitudinal axis of the arm for frictional engagement with the top of said channel from above;

and selective locking means carried by said transverse shaft and adapted to exert axial compression simultaneously upon the traversed cross strut ends and upon the pair of arms, whereby the cross struts may be held at selected outspread positions of the hood and the pair of arms may simultaneously secure the assembly to a chosen location along the convex channel of the carrier.

2. The assembly of claim 1 which is characterized by said channel attachment means carried by each of said transverse shafts, whereby the assembly may thus be locked to both of the convex side channels of a baby carrier.

3. The assembly of claim 1 wherein said latch arm is characterized by a generally chordal contact portion, which latch arm is pivotally swung from said transverse shaft offcenter to the radius of said chordal portion, whereby essentially the entire chordal length may frictionally contact the top of such convex channel when said hook-like arm engages the channel from beneath.

4. The assembly of claim 1 wherein said cross struts collectively form essentially the whole extensible length of said hood when outspread, and successive struts are provided with mutually engagable stop means adapted to prevent their further separation.

5. The assembly of claim 1 which is additionally characterized by a generally flat, positioning panel having one end secured to a cross strut of said hood and a body disposed slidable lengthwise along the floor of such carrier upon movement of the attachment means along the side channels of a carrier.

6. The assembly of claim 5 wherein the other end of said positioning panel is forked so as to be selectively engagable with successive pairs of cross slots formed in the floor of such carrier.

7. A baby carrier having a convex upwardly-bowed channel disposed along each longitudinal side thereof and having the hood assembly of claim 1 mounted thereon.

8. A baby carrier having a convex upwardly-bowed channel disposed along each longitudinal side thereof and having the hood assembly of claim 5 mounted thereon.

9. A baby carrier having a convex upwardly-bowed channel disposed along each longitudinal side thereof and having the hood assembly of claim 3 mounted thereon.

10. A baby carrier having a convex upwardly-bowed channel disposed along each longitudinal side thereof and having the hood assembly of claim 4 mounted thereon.

* * * * *